Sept. 12, 1967 J. C. HOLLAND 3,340,892

ELECTRONIC DETECTION AND CONTROL SYSTEM

Filed Dec. 16, 1963 2 Sheets-Sheet 1

INVENTOR:
JAMES C. HOLLAND

BY Howson & Howson

ATTYS.

Sept. 12, 1967 J. C. HOLLAND 3,340,892
ELECTRONIC DETECTION AND CONTROL SYSTEM
Filed Dec. 16, 1963 2 Sheets-Sheet 2
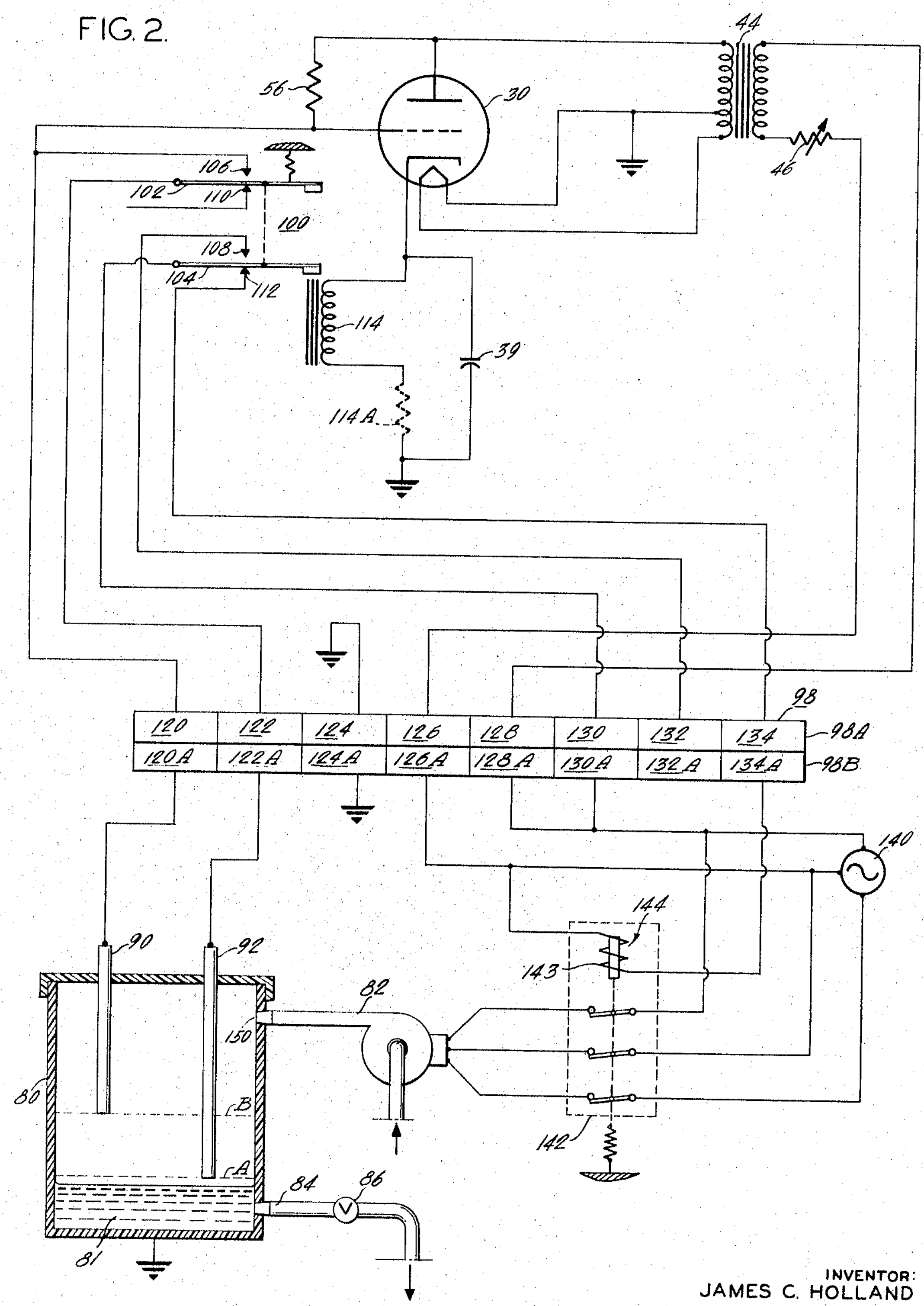
INVENTOR:
JAMES C. HOLLAND
BY Howson & Howson
ATTYS.

United States Patent Office 3,340,892

Patented Sept. 12, 1967

3,340,892

ELECTRONIC DETECTION AND CONTROL SYSTEM

James C. Holland, 1403 N. Franklin St., Marshall, Tex. 75670

Filed Dec. 16, 1963, Ser. No. 330,780
7 Claims. (Cl. 137—392)

This invention relates to apparatus for detecting changes in resistance of an element, and particularly to apparatus for indicating and/or controlling the extent or level of electrically conductive materials.

There are a variety of applications in the prior art in which it is desired to detect changes in electrical resistance of an element and, preferably, to actuate a relay in response to such changes. One important application lies in systems for sensing and/or controlling the physical extension, usually the vertical level, of conductive materials such as conductive liquids, powders or granules, for example water, acids or activated carbon. Typically the conductive material is stored in a container or reservoir to which it is supplied and from which it is withdrawn as needed, and it is desired to provide indications of when the level of the material in the container has risen or fallen to a predetermined level, in many cases it is also desired automatically to control the supplying of the material to the container so as to maintain the level thereof within a predetermined range. This is typically accomplished, broadly, by sensing the material level, producing electrical signals indicative thereof, and using the electrical signals so produced to operate indication or control equipment, often by way of one or more electrical relay devices.

A variety of apparatus has been proposed in the past for the level-sensing and signal-producing functions described above, including for example float switches, pneumatic switches, diaphragm switches and capacitance relays. A further class of such apparatus employs conductive contacts which are placed so that the conductive material itself serves electrically to connect or disconnect the contacts from each other, depending on the material level, and the resulting change in resistance between the contacts therefore provides an indication of the material level. The apparatus of the present invention, while having broad application, is especially adapted for use in connection with apparatus of the latter class to produce electrical indications and/or control signals in response to changes in level of a conductive material.

Other applications in which indication and/or control operations are to be provided in response to resistance changes include temperature-sensing systems, as well as a variety of other systems in which the change in resistance produced by the opening and closing of a switching element of low-current-capacity is to be used to operate a relay of higher current rating.

Accordingly it is an object of the present invention to provide new and useful apparatus for detecting changes in resistance of an element, and preferably for producing indication or control functions in response to said resistance changes.

Another object is to provide apparatus for producing indications of the physical extent, usually the vertical level, of an electrically-conductive material.

A further object is to provide apparatus for maintaining the level of an electrically-conductive material within a predetermined range by means of at least two electrodes for contacting different portions of the conductive material and a control circuit including a vacuum tube and a relay device, in which apparatus one of said electrodes may conveniently be connected directly to the common ground of said circuit.

It is also an object to provide apparatus of the above-described general type characterized by one or more of the features of simplicity, reliability, inexpensiveness, adaptability to use with a large variety of conductive materials of differing conductances, ease of maintenance, and operability in response to small currents.

In accordance with the invention there is employed a current-discharge amplifying device having a current-emitting element, a current-collecting element, and a current-controlling element which controls current flow through the amplifying device in accordance with variations in the bias voltage thereof with respect to said current-emitting element; typically the amplifying device is a triode vacuum tube. Means are provided for applying operating voltage at least intermittently between the current-collecting element and a point at reference potential to which the current-emitting element is connected by way of an impedance element; preferably said means comprises a source of alternating voltage connected between the plate of a vacuum tube and the point at reference potential. Increases in the conduction occurring in the amplifying device produce a corresponding increase in self-bias voltage across said impedance element, which self-biasing voltage is of the polarity to tend to decrease the current flow in the discharge device in proportion to the magnitude of said self-bias. Preferably the impedance element comprises the control coil of a relay, the controlled contacts of which relay are typically used to actuate indicator or control equipment.

The current-controlling element of the amplifying device is supplied by way of a resistive element with a bias voltage which, in the absence of other connections to said current-controlling element, is such as to render said discharge device sufficiently conductive to energize said relay despite the current-limiting effect of the self-bias provided by said impedance element. An element of variable resistance is connected between the current-controlling element and the point at reference potential, so that in the high-resistance state of said variable-resistance element the bias of said current-controlling element is such as to maintain in the amplifying device and relay winding an intensity of current flow for which the relay is energized, but so that a predetermined lower-resistance state of said variable-resistance element changes the bias at the current-controlling element toward said reference potential sufficiently that the self-bias of the discharge device causes the relay current to fall below the energization level thereof, thus de-energizing the relay. Accordingly a change of the resistance of the variable-resistance element from its high-resistance state to its low-resistance state de-energizes the relay, while a return to its high-resistance state re-energizes the relay.

In a preferred form of the invention, the variable-resistance element comprises the resistance between a pair of conductors associated with a container for holding a conductive material, the conductors being so positioned that when the level of the material rises sufficiently the two conductors are connected together by the relatively low resistance of the conductive material to produce the above-mentioned low-resistance state, while when the level of the material falls so that it no longer extends entirely between the conductors a high resistance is produced between the contacts corresponding to the above-mentioned high-resistance state. Accordingly the relay device is energized or de-energized depending upon whether the conductive material is above or below a predetermined level in the container. The contacts of the relay may then be utilized to operate indicating devices showing when the conductive material rises above or falls below a given level in the container, and/or may be utilized to control the supply or withdrawal of conductive material from the container so as to maintain the level in a predetermined range.

In a preferred embodiment the control circuitry utilized in accordance with the invention comprises an ordinary triode vacuum tube, an energizing coil of a relay connected between the cathode of the vacuum tube and reference potential, a resistor connecting the plate of the tube to the grid thereof, an A.C. source connected between the plate of the tube and reference potential, and appropriate lead connections from the grid of the tube and from the source of reference potential to the variable-resistance element whose resistance changes are to be indicated, which element typically comprises two conductive probes extending at different heights into a conductive container into which conductive material is introduced. In this form the circuit is extremely simple, uses a minimum of components, is operable with an ordinary alternating-voltage supply source, operates with a wide range of conductance of the conductive material, and requires only a very low level of current through the conductive material to provide the required operation. Preferably energization of the relay winding actuates relay switch contacts to shut off the supplying of conductive material to the container, and to connect the lower probe to the higher probe, whenever the level of conductive material rises into contact with the higher probe; and to restart the supplying of conductive material to the container, and to disconnect the lower probe from the higher probe, whenever the level falls below the lower probe. By this means the level is automatically maintained between the lower ends of the two probes.

Other objects and features of the invention will be more readily understood from a consideration of the following detailed description, taken in connection with the accompanying drawings, in which:

FIGURE 2 is a schematic diagram illustrating apparatus in accordance with the invention for controlling automatically the level of a conductive material in a container.

Figure 1:
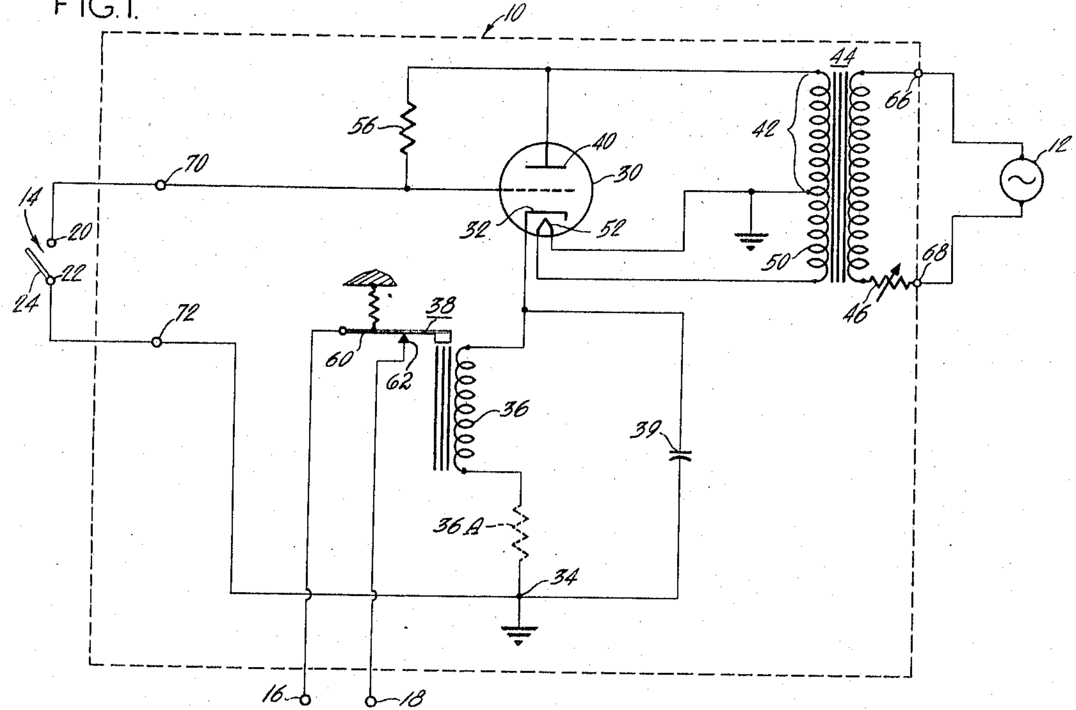
FIGURE 1 is a schematic diagram illustrating one basic form of circuit embodying the invention.

Referring now particularly to the circuit arrangement illustrated in FIGURE 1, there is shown therein a relay control circuit 10 which, when supplied with operating power from an alternating current source 12, is responsive to increasing and decreasing of the resistance of a variable-resistance element 14 to produce a short circuit and open circuit, respectively, between the controlled output terminals 16 and 18. In this case the variable-resistance element 14 is in the form of a switch, and presents a resistance between the fixed terminals 20 and 22 thereof which is nearly infinite when the switch arm 24 is open as shown, while this resistance is substantially zero when the switch arm is closed to connect terminals 20 and 22 directly together. In some instances the switch 14 may be the controlled switch contact of a low-power relay device, in which case the relay control circuit 10 is useful to provide corresponding relay-switch action between terminal 16 and 18 at higher power levels; the variable-resistance switch element 14 may also take any of many other forms, including thermally-responsive devices which change their resistances substantially with temperature, but between values less extreme than the substantially zero-to-infinity resistance change of an ordinary switch. However, as will be described later herein in detail, the relay circuit 10 is especially useful in combinations in which the variable-resistance element 14 comprises the resistance between material-contacting electrodes of level-sensing apparatus.

Relay control circuit 10 in this example comprises an ordinary triode vacuum tube 30 having its current-emissive cathode 32 connected directly to a point 34 at a reference potential designated as ground, by way of the control winding 36 of a relay 38, the internal resistance of winding 36 being represented by a resistive element 36A shown in dotted line to emphasize that it does not represent a separate physical element. A capacitor 39 is preferably connected between cathode 32 and ground point 34 for purposes indicated hereinafter. The current-may be the usual 60-cycle line, preferably by way of a transformer-secondary winding 42 of transformer 44, the other end of secondary winding 42 being grounded. The primary of transformer 44 is supplied with alternating potential from the alternating-current source 12, which may be the usual 60-cycle line, preferably by way of a variable resistor 46 which permits adjustment of the magnitude of the voltage supplied to the transformer from the source 12. An additional low-voltage secondary winding 50 of transformer 44 supplies the usual filament heating current to filament 52 of tube 30. The effect of the transformer arrangement is therefore to provide proper heating of tube 30 and to apply an A.C. voltage across the series combination of tube 30 and relay winding 36 including its resistive component represented as 36A.

A resistor 56 of relatively high value is connected directly between the plate and grind of the tube 30, and the variable-resistance element 14 is connected directly between the grid of tube 30 and reference-potential point 34. The output terminals 16 and 18 are connected respectively to the movable switch arm 60 and to the fixed contact 62, respectively, of the relay 38, arm 60 being spring-biased upwardly away from contact 62 but arranged to close against contact 62 when sufficient current flows through relay winding 36 to energize the relay 38.

In operation, the A.C. line voltage source 12 is connected across terminals 66 and 68 of relay-control circuit 10, as by means of a conventional line cord plug, while the variable resistance element 14 is connected across the terminals 70 and 72 thereof, as by means of a conventional plug and socket arrangement. Considering first the operation when variable-resistance element 14 is in its high-resistance state, i.e. when the switch arm 24 is open, the alternating supply voltage from source 12 heats filaments 52 by way of secondary transformer winding 50 and also applies operating alternating plate potential between the plate 40 of tube 30 and ground. Alternating potential in phase with the potential of the plate 40 of tube 30 is applied to the grid of tube 30 by way of the resistor 56. Accordingly, during the half-cycles of the A.C. supply voltage during which the plate and grid potentials of tube 30 are positive, tube 30 conducts to pass a current through relay winding 36 in the cathode circuit thereof, thereby energizing relay 38 to close arm 60 to contact 62 and thus to interconnect output contacts 16 and 18. Capacitor 39 tends to smooth the current pulses through winding 36 and to prevent chattering of the relay contacts. The magnitude of the supply voltage applied between the plate of tube 30 and ground is preferably selected, or adjusted by means of resistor 46, to a magnitude just sufficient to maintain the relay 38 energized with switch arm 24 open, and hence so that a small decrease in current through tube 30 will de-energize the relay.

It is pointed out that, during the above-described relatively strong conduction through tube 30 and winding 36, the resistance 36A of winding 36 provides a resistive cathode load for tube 30 across which the tube current produces a voltage drop. The voltage drop is of the polarity to make the cathode 32 of tube 30 positive with respect to ground by an amount proportional to the average current through the tube and the value of resistance 36A. Since this self-biasing voltage is of a polarity to make the cathode 32 more positive with respect to ground, it tends to reduce the positive bias of the grid of tube 30 with respect to cathode 32, and results in a tube current which is less than would be produced in the absence of such cathode resistance. Since the grid of tube 30 is returned through resistor 56 to a point in the circuit at which the most positive voltage is developed, tube 30 remains strongly conductive despite this self-bias produced in the cathode circuit so long as switch arm 24 is open to produce the high-resistance state of element 14.

However, when variable resistance element 14 is changed to its low-resistance state by closing switch arm 24, the potential of the grid of tube 30 is thereby effectively reduced from a positive value to ground potential, and the self-bias produced by the resistance 36A of winding 36 then causes the cathode 32 to become more positive than the grid and hence to reduce the tube current to a value sufficiently low that relay 38 is then de-energized, thus permiting spring-biased arm 60 to move upward and disconnect output terminals 16 and 18 from each other.

The circuit of FIGURE 1 therefore produces a cathode self-bias by means of the resistance 36A of the relay winding 36 which tends to cut off the tube 30, but which is incapable of so doing so long as switch arm 24 is open to permit the grid of tube 30 to be supplied with a substantial potential from the plate of tube 30; however, the cathode self-bias is sufficient to reduce the tube current below the drop-out level of relay 38 when switch arm 24 is closed to ground the grid of tube 30.

In this arrangement the current through the control circuit including the variable-resistance element 14 is extremely low at all times, being zero when the switch arm 24 is open and being very low when switch arm 24 is closed because the resistor 56 has a high value which is in series with variable-resistance element 14. This permits the use of a delicate, low-current, relay switch contact for element 14, and also permits the use of level-sensing apparatus for device 14 in which the material whose level is to be sensed is one through which it is desired to pass as small a current as possible.

The output terminal 16 and 18 can be utilized for any desired control or indicating functions, for example to operate indicating alarms in the form of lights or audio signals, or to operate control apparatus as described hereinafter. Additional contact elements and arrangements may be coupled to relay 38 to provide a plurality of such indication and control functions when desired.

The extreme simplicity of the relay-control circuit 10 is evident from FIGURE 1, the parts being not only few in number but simple and readily available. The circuit nevertheless is operable with power from the usual A.C. line source, and its sensitivity can be made great by the above-described adjustment such that the high-conduction state of the tube is just sufficient to energize relay 38. Further, the circuit permits one side of the variable-resistance element 14 to be grounded at all times, as is particularly advantageous in permitting the use of a grounded container in level-control applications of the invention.

FIGURE 2, in which parts corresponding to those of FIGURE 1 are indicated by corresponding numerals, illustrates the combination of a circuit similar to that illustrated in FIGURE 1 with apparatus for automatically controlling the level of a conductive material. In this example a conductive container 80, which may be of metal, is grounded and a conductive material 81 such as activated carbon, water, or other substance is introduced into the container by operation of a controlled pump or conveyor 82, and withdrawn from the bottom of the container by way of an outlet line 84 which may be provided with an appropriate valve 86. The container 80 may be utilized as a reservoir from which the conductive material is to be withdrawn as needed, the apparatus provided being such as to insure that an adequate supply of the conductive material will be maintained in the container 80 without having the material overflow the top of the container at any time.

The desired control of the material level is accomplished, in general, by providing an upper sensing probe 90 and a lower sensing probe 92 for producing electrical signals indicative of the level of the conductive material, which signals are utilized to turn the pump 82 on and off at appropriate times for maintaining the desired level of material. To accomplish this desired control function there is employed a relay-control circuit like that shown in FIGURE 1, with the exception of the addition of further relay switch contacts and connections, as shown above the plug-and-socket arrangement 98 in FIGURE 2. Thus, the arrangement of vacuum tube 30, transformer 44, variable resistor 46, fixed resistor 56, capacitor 39, and the relay is substantially identical with that shown in FIGURE 1, with the exception that the relay 38 of FIGURE 1 has been replaced by a relay 100 in which the switch contacts are in the form of a double-pole, double-throw switch as shown. More particularly, the relay switch arms 102 and 104 are mechanically ganged together and both spring-biased upwardly so as to connect them normally with contacts 106 and 108 respectively, and are responsive to energization of relay 100 to be pulled downwardly against contacts 110 and 112 respectively. Such energization of the relay is produced by current in excess of the relay-drop-out level passing through the relay winding 114 having the resistance 114A, as described previously. In this particular arrangement of the invention the relay switch contacts 108 and 110 are not utilized, but this form of relay using double-pole, double-throw switch contacts has been found to be especially convenient and adaptable for use in connection with a large variety of applications of the circuitry shown.

Operating line power as well as the connections for the relay contacts and the level-sensing probes are made by way of the plug-and-socket arrangement 98. Thus, segments 120, 122, 124, 126, 128, 130, 132, and 134 of plug-and-socket arrangement 98 may comprise an integral plug 98A by which said segments are connected respectively to the corresponding lower segments 120A, 122A, 124A, 126A, 128A, 130A, 132A, and 134A of a lower integral socket 98B. This permits the upper portion of the circuit of FIGURE 2 to be made and used conveniently as a separate entity by itself, to which plug-in connection may be made for operation in conjunction with any desired form of equipment as represented in the lower portion of FIGURE 2.

In this case the input power for transformer 44 is derived from two phases of the three-phase A.C. source 140 by way of plug-and-socket segments 126, 126A, and 128, 128A. Upper probe 90 is connected directly to the grid of tube 30 by way of plug-and-socket segments 120 and 120A, while the lower probe 92 is connected to the movable arm 102 of the relay 100 by way of plug-and-socket segments 122 and 122A. Due to the upwardly-directed spring biasing of relay arm 102, lower probe 92 is connected directly to the grid of tube 30 when the current through the tube is below the drop-out value for relay 100, but is disconnected from the grid of tube 30 when tube 30 conducts sufficiently to energize relay 100.

Pump 82 is operated by three-phase electrical power supplied thereto from source 140 by way of the triple-pole, single-throw, solenoid-actuated switch 142. The poles of switch 142 are normally spring-biased open so that the pump 82 is inoperative, but all are closed simultaneously by the passage of sufficient current through the winding 143 of the solenoid device 144, associated therewith. The upper end of the solenoid winding 143 is connected directly to the middle one of the three output terminals of three-phase A.C. source 140, while the lower end of winding 143 is connected by way of plug-and-socket segments 134, 134A to the lower contact 112 of relay 100. Accordingly the lower end of the winding of solenoid 144 is open-circuited when switch arm 104 is in its upward position but, when relay 100 is energized by current through tube 30, the lower end of solenoid 144 is connected by way of relay arm 104 and plug-and-socket segments 130 and 130A to the upper terminal of A.C. source 140. Energization of relay 100 therefore energizes solenoid 144 to turn on pump 82.

The operation of the arrangement shown in FIGURE 2 is as follows. Assuming first the condition in which container 80 is empty, neither of probes 90 and 92 contacts the conductive material 81 and hence neither provides a circuit to ground for the grid of tube 30. Under these conditions, as described previously with respect to FIGURE 1, tube 30 is rendered strongly conductive by its positive grid voltage so as to energize relay 100, which causes both of relay switch arms 102 and 104 to be pulled downwardly into the position shown in FIGURE 2 so that the connection from the lower probe 92 to the grid of tube 30 is open, while a circuit from A.C. source 140 through solenoid winding 143 is completed thereby to close the switch elements of switch 142 and cause pump 82 to begin to operate.

Pump 82 then delivers the conductive material from any appropriate source through an aperture 150 near the upper end of container 80, so that the level of the material 81 rises in container 80. When the conductive material rises to the level A at which it first contacts the lower end of the lower probe 92, there is no change in operation since lower probe 92 is at this time disconnected from the grid of tube 30 by the above-described energization of relay 100. Pump 82 therefore continues to deliver the conductive material into the container 80 until the material reaches the level B corresponding to the lower end of the upper probe 90. At this time the conductive material 81 provides a low-resistance path from probe 90 to the grounded container 80, thus grounding the grid of tube 30. As described previously in connection with FIGURE 1, this causes the current through tube 30 to fall to a low level for which relay 100 is de-energized, thus permitting both relay arms 102 and 104 to return to their normal upward positions. As a result, separation of switch arm 104 from contact 112 opens the circuit between A.C. source 140 and solenoid winding 143, thus permitting the switch elements of switch 142 to open and terminating operation of pump 82. At the same time the upward motion of arm 102 into contact with contact 106 connects the lower probe 92 to the grid of tube 30 and to higher probe 90.

As conductive material is removed from container 80 by way of outlet line 84 during subsequent use, the level of the conductive material 81 falls below the level B, thus breaking the conductive path from probe 90 to ground. However, probe 92 remains in contact with the conductive material until the level falls to level A, so that the grid of tube 30 remains connected to ground through probe 92 and the conductive material during this interval. Accordingly tube 30 remains in its low-conduction state and relay 100 remains de-energized until the level of material 81 has fallen below the level A, after which point there is no circuit to ground through the conductive material from either of the probes and tube 30 reutrns to its high-conduction state for which relay 100 is energized. At this point solenoid 144 is re-energized and the switch elements of switch 142 closes to re-start the pump 82.

It will therefore be appreciated that by operation of the above-described circuit the level of the conductive material 81 in the container 80 is maintained substantially between the levels A and B, as is desired to provide a reservoir of conductive material 81 at all times available for removal by way of outlet pipe 84.

Figure 3:
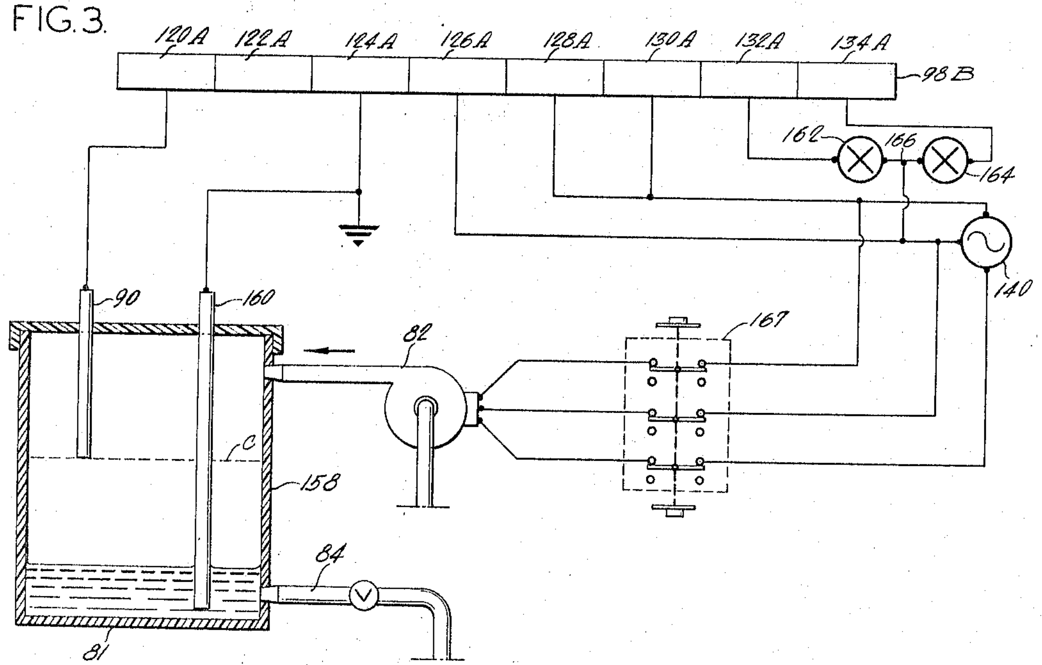
FIGURE 3 illustrates an alternative form for a portion of the circuit of FIGURE 2 in which indication, rather than automatic control, of the level of the liquid is provided.

FIGURE 3 illustrates one alternative arrangement of apparatus which may be substituted for that shown below the lower segment **98*b* of the plug-and-socket 98 in FIGURE 2, while using the same arrangement shown in the upper portion of FIGURE 2 for the relay-control circuit. In FIGURE 3 the pump 82 is manually, rather than automatically, controlled, and alarm indications, which may be audible or visual in nature, are provided to indicate whether the level of the conductive material 81 is below the lower end of the upper probe 90 or high enough to contact it. In this example the container 158 is shown as being entirely of an insulating material and a probe 160 is provided with its lower end below the level of the output line 84 and is grounded; however, if the container 158 is electrically conductive it may be grounded and the probe 160 then is not required. As in the arrangement of FIGURE 2, operating power for the tube 30 is provided from the three-phase A.C. source 140 by way of segments 126A and 128A, and probe 90 is connected to the grid of tube 30 by way of segment 120A. The upper terminal of A.C. source 140 is also again connected to segment 130A so as to connect with a lead from the arm 104 of relay 100. However, in this case the segments 132A and 134A are connected across the series combination of two alarm devices 162 and 164, the point 166 between the two alarm devices being connected to the middle output terminal of A.C. source 140**.

In the operation of the arrangement utilizing the apparatus of FIGURE 3, when the manually-operable switch 167 is closed to start the pump 82, the conductive material 81 is introduced into container 158 and the level thereof rises toward the level C at which it contacts the lower end of probe 90. Until the conductive material reaches the level C the relay 100 remains energized as described previously, so that segment 134A is connected by way of relay contact 112 to the center output terminal of A.C. source 140 thus causing only alarm device 164 to operate, for example to turn on a light or sound a buzzer. However, when the level of the conductive material reaches the level C, probe 90 and the grid of tube 30 are effectively shorted to ground to de-energize the relay 100 and to cause segment 132A, rather than 134A, to be connected to the middle output terminal of A.C. source 140. As a result, when the conductive material rises into contact with probe 90, the alarm device 162, rather than 164, is operated. The alarm provided by device 162 will indicate to an operator that switch 167 should be manually opened to prevent overflow of the container. As conductive material is drawn from the container during subsequent use, the level of the material may fall until it is below the level C, at which time the alarm device 164 will be actuated in place of alarm device 162, thus indicating to an operator that switch 167 should again be closed to restore the level of conductive material in container 158 to its more-nearly filled condition.

Without thereby intending in any way to limit the scope of the invention, the following example of one form of elements which may be utilized in an arrangement such as that shown in FIGURE 2 is provided in the interest of complete definiteness. The amplifying device 30 may be one-half of a 12AU7A double-triode vacuum tube; the resistance 114A of relay winding 114 may be 10,000 ohms; and the value of resistor 56 may be 3.9 megohms. The latter value of resistance is many times greater than the resistance from either probe to ground when the conductive material contacts the probe, but is small compared with the resistance between either probe and ground when the conductive material is not in contact with the probe. Capacitor 39 may have a capacity of 2 microfarads. The operating potential source 140 may be an ordinary 220-volt three-phase source having a central neutral line and two oppositely-phased 110-volt lines. The current through the conductive material is typically of the order of 0.1 microampere.

While the invention has been described with particular reference to specific embodiments thereof, it will be understood that it may be embodied in any of a large variety of forms diverse from those specifically illustrated and described, without departing from the scope and spirit of the invention as defined by the appended claims.

I claim:

1. Apparatus for providing signals indicative of the physical extent of a flowable electrically-conductive material such as a liquid, powder, granular agglomerate or the like, comprising:

first electrically-conductive means, and second electrically-conductive means spaced from said first electrically-conductive means;

means for changing the accumulation of said flowable electrically-conductive material adjacent said first and second means so that said material at times bridges said first and second means and at other times fails to bridge said first and second means;

a vacuum tube having an anode, a cathode and a control grid and capable of being controlledly changed progressively and continuously between a high-conduction state and a low-conduction state by corresponding progressive and continuous variation of the grid-to-cathode voltage thereof;

relay means comprising a control coil and at least a pair of contacts having an open and a closed condition, said relay means being responsive to increases in current through said coil to a predetermined first relatively-higher value to operate said pair of contacts to one of said conditions and responsive to decreases in said current to a predetermined relatively-lower second value to operate said pair of contacts to the other of said conditions;

a source of reference potential;

direct-current conductive circuit means connecting said control coil between said cathode and said source of reference potential;

means conductively connecting one of said first and second means to said source of reference potential and the other of said first and sceond means to said grid, whereby the potential of said grid is held substantially at said reference potential when said electrically-conductive material bridges said first and second means;

said direct-current conductive circuit and said coil having a resistance sufficient to produce a cathode self-bias which reduces said current through said coil to said second relatively-lower value, for which said contacts are operated to the other of said conditions thereof, when said material bridges said first and second means and causes said grid to be held substantially at said reference potential;

resistive means for applying alternating voltage from said source to said grid in a magnitude large enough to increase said current through said coil to said predetermined first relatively-higher value, despite the self-biasing effect of said coil resistance, so long as said conductive material fails to bridge said first and second means; and means connected to said contacts of said relay means for producing different electrical signals when said contacts are in said open condition than when they they are in said closed conditions.

2. Apparatus for providing signals indicative of the level of a flowable electrically-conductive material such as a liquid, powder, granular agglomerate or the like, comprising:

first means for containing a flowable electrically-conductive material and for making electrical contact thereto both when its level is above and when its level is below a predetermined level therein;

second means positioned to provide electrical contact to said material only when it extends above said predetermined level;

means for changing the level of said material in said container so that said material at times bridges said first and second means and at other times fails to bridge said first and second means;

a vacuum tube having an anode, a cathode and a control grid and capable of being controlledly changed progressively and continuously between a high-conduction state and a low-conduction state by corresponding progressive and continuous variation of the grid-to-cathode voltage thereof;

relay means comprising a control coil and at least a pair of contacts having an open and a closed condition, said relay means being responsive to increases in current through said coil to a predetermined first relatively-higher value to operate said pair of contacts to one of said conditions and responsive to decreases in said current to a predetermined relatively-lower second value to operate said pair of contacts to the other of said conditions;

a source of reference potential;

direct-current conductive circuit means connecting said control coil between said cathode and said source of reference potential;

means conductively connecting one of said first and second means to said source of reference potential and the other of said first and second means to said grid, whereby the potential of said grid is held substantially at said reference potential when said electrically-conductive material bridges said first and second means;

said direct-current conductive circuit and said coil having a resistance sufficient to produce a cathode self-bias which reduces said current through said coil to said second relatively-lower value, for which said contacts are operated to the other of said conditions thereof, when said material bridges said first and second means and causes said grid to be held substantially at said reference potential;

resistance means for applying alternating voltage from said source to said grid in a magnitude large enough to increase said current through said coil to said predetermined first relatively-higher value, despite the self-biasing effect of said coil resistance, so long as said conductive material fails to bridge said first and second means; and means connected to said contacts of said relay means for producing different electrical signals when said contacts are in said open condition than when they are in said closed conditions.

3. Apparatus in accordance with claim 2, in which said first means is connected to said source of reference potential and said second means is connected to said grid.

4. Apparatus in accordance with claim 2, in which said means connected to said contacts of said relay means comprise alarm means responsive to the condition of said contacts produced by said bridging of said first and second means for producing an alarm indicative of attainment of said predetermined level by said material.

5. Apparatus in accordance with claim 2, comprising third means for contacting said material only when it extends above a second level lower than said predetermined level, means responsive to actuation of said relay means to terminate further increases in the level of said material and to connect both said second and third contacting means to said grid whenever said material rises to said predetermined level, and means responsive to deactuation of said relay means to increase the level of said material and to disconnect said third contacting means from said grid whenever said level of said material falls below said second level, whereby the level of said material is constrained to remain substantially between said predetermined level and said second lower level.

6. Apparatus for providing alarm indications of the attainment by an electrically-conductive material of a predetermined level in a container, comprising:

material delivery means for supplying said material to said container to increase the level thereof in said container;

first contacting means positioned above said material to contact said material only when its level has increased to a predetermined level;

second contacting means for providing external electrical connection to said material regardless of whether its level is above or below said predetermined level;

a vacuum tube having an anode, a cathode and a control grid and capable of being controlledly changed progressively and continuously between a high-conduction state and a low-conduction state by corresponding progressive and continuous variation of the grid-to-cathode voltage thereof;

relay means comprising a control coil and at least a pair of contacts having an open and a closed condition, said relay means being responsive to increases in current through said coil to a predetermined first relatively-higher value to operate said pair of contacts to one of said conditions and responsive to decreases in said current to a predetermined relatively-lower second value to operate said pair of contacts to the other of said conditions;

a source of reference potential;

conductive circuit means connecting said control coil between said cathode and said source of reference potential;

means connecting said second contacting means to said source of reference potential and connecting said first contacting means to said grid;

said conductive circuit means and said coil having a resistance sufficient to produce a cathode self-bias which reduces said current through said coil to said second relatively-lower value when said material bridges said first and second contacting means;

resistive means for applying alternating voltage from said source to said grid in a magnitude large enough to increase said current through said coil to said predetermined first relatively-higher value so long as said conductive material fails to bridge said first and second contacting means; and alarm means connected to said relay contacts for producing a different alarm indication when said relay contacts are in one of their conditions due to said material reaching said predetermined level than when said contacts are in their other condition due to said material having a level below said predetermined level.

7. Apparatus for maintaining the level of a conductive material between prescribed limits, comprising:

an electrically-conductive container;

means for supplying a conductive material to said container;

means for withdrawing said material from said container;

first contacting means in said container for contacting said material only when said material fills said container sufficiently to extend above a predetermined first level;

second contacting means in said container for contacting said material only when said material extends above a predetermined second level higher than said first level;

a vacuum tube having an anode, a cathode and a control grid and capable of being controlledly changed progressively and continuously between a high-conduction state and a low-conduction state by corresponding progressive and continuous variation of the grid-to-cathode voltage thereof;

relay means comprising a control coil and at least a pair of contacts having an open and a closed condition, said relay means being responsive to increases in current through said coil to a predetermined first relatively-higher value to operate said pair of contacts to one of said conditions and responsive to decreases in said current to a predetermined relatively-lower second value to operate said pair of contacts to the other of said conditions;

a source of reference potential;

conductive circuit means connecting said control coil between said cathode and said source of reference potential;

means connecting said second contacting means to said grid and said container to said source of reference potential;

said conductive circuit means and said coil having a resistance sufficient to produce a cathode self-bias which reduces said current through said coil to said second relatively-lower value, for which said contacts are operated to said other of said conditions thereof, whenever said material extends to a level for which it provides connection between said grid and said container;

resistive means for applying alternating voltage from said source to said grid in a magnitude large enough to increase said current through said coil to said predetermined first relatively-higher value, despite the self-biasing effect of said coil resistance, so long as said conductive material fails to provide connection between said grid and said container; and means connected to said relay contacts for discontinuing operation of said material supply means and connecting said first contacting means to said grid when said relay means is actuated by contact of said material with said second contacting means, and for reinitiating operation of said material-supplying means and disconnecting said first contacting means from said grid when said material falls below said predetermined first level, whereby the level of said material is automatically maintained substantially between said first and second levels.

References Cited

UNITED STATES PATENTS

| | | | |
|---|---|---|---|
| 2,352,240 | 6/1944 | Wolfner | 317—149 X |
| 3,155,049 | 11/1964 | Maudelbaum et al. | 137—392 X |
| 3,170,479 | 2/1965 | Mueller | 137—392 |

WILLIAM F. O'DEA, *Primary Examiner.*

D. MATTHEWS, *Assistant Examiner.*

UNITED STATES PATENT OFFICE

CERTIFICATE OF CORRECTION

Patent No. 3,340,892 September 12, 1967

James C. Holland

It is hereby certified that error appears in the above numbered patent requiring correction and that the said Letters Patent should read as corrected below.

Column 4, line 6, strike out "may be the usual 60-cycle line, preferably by way" and insert instead -- collecting plate 40 is connected directly to one end --; column 7, line 55, for "reutrns" read -- returns --; line 67, for "98b" read -- 98B --; column 10, line 27, for "resistance" read -- resistive --.

Signed and sealed this 27th day of August 1968.

(SEAL)
Attest:

Edward M. Fletcher, Jr.
Attesting Officer

EDWARD J. BRENNER
Commissioner of Patents